Figure 1:
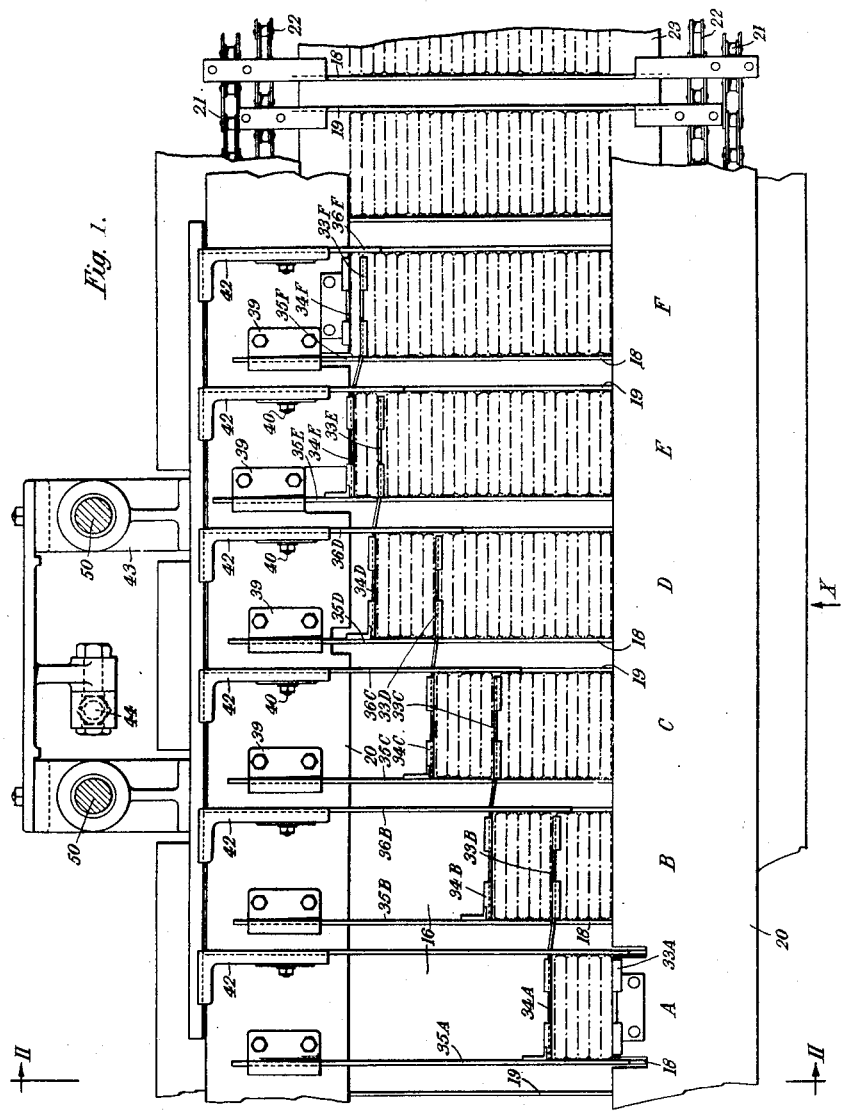

Feb. 8, 1955  A. RUSSELL  2,701,633
PACKAGING MECHANISM

Filed Jan. 14, 1954  3 Sheets-Sheet 1

INVENTOR
Alexander Russell
By Watson, Cole, Grindle &
Watson
ATTORNEYS

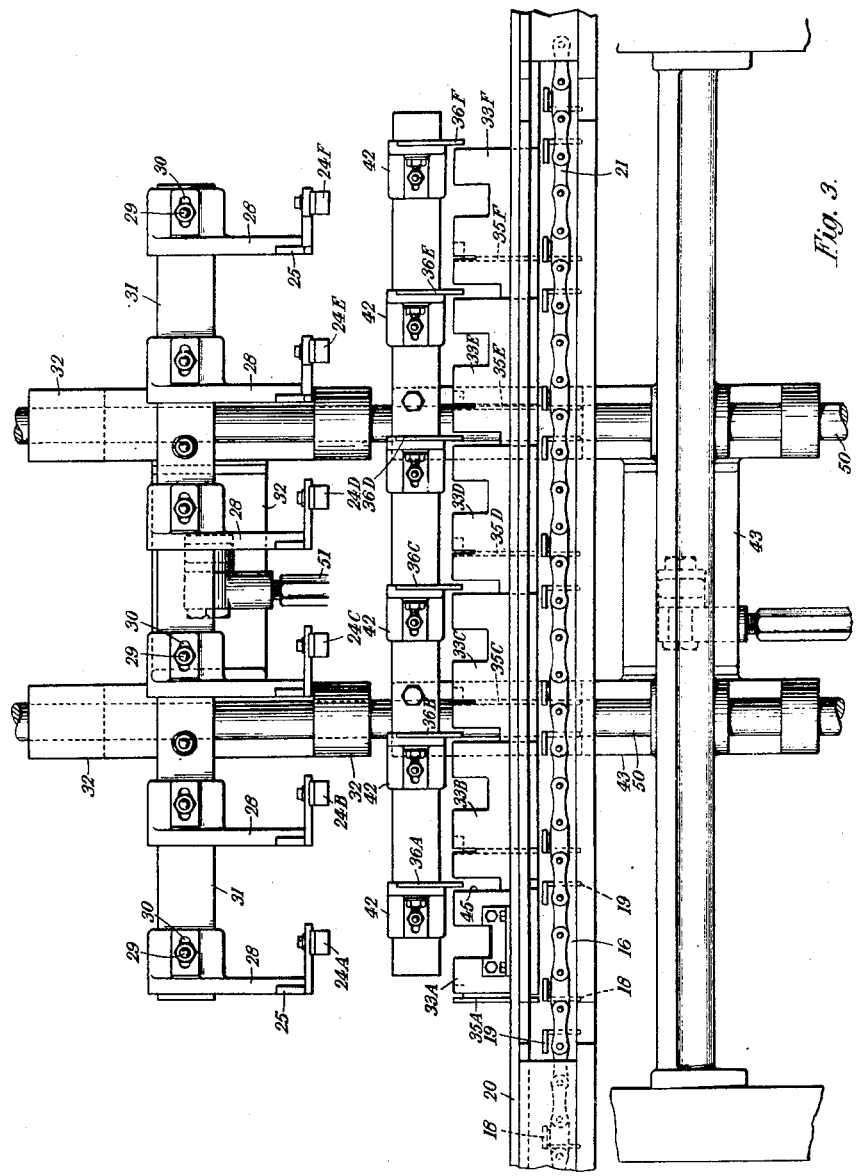

United States Patent Office 2,701,633
Patented Feb. 8, 1955

2,701,633

PACKAGING MECHANISM

Alexander Russell, Leeds, England, assignor to The Forgrove Machinery Company Limited, Leeds, England, a company of Great Britain Application January 14, 1954, Serial No. 403,975

Claims priority, application Great Britain January 26, 1953

5 Claims. (Cl. 198—35)

In U. S. Patent No. 2,683,520 I have described mechanism for automatically charging, with loose biscuits or the like, the feed pockets of an intermittently moving feed conveyor, comprising a plurality of magazines, means for extracting at each machine cycle a batch of loose biscuits or the like from each magazine (the total number of biscuits in all the batches taken together being that required to fill a feed pocket of the conveyor), and means for thereafter transferring the batches into positions above successive feed pockets, each batch being brought to a position above a different feed pocket, and depositing the batches of biscuits on edge in said feed pockets, the positions to which the batches are transferred being such that the batches are deposited in succession side by side in the feed pockets to fill them.

In the mechanism described in detail in U. S. Patent No. 2,683,520 the magazines are inclined to the horizontal at a small angle, e.g. 15°, and extend transversely to the direction of run of the conveyor, and the mechanism includes separators, one associated with each magazine, for lifting, at each machine cycle, batches of biscuits from the lower ends of the magazines, transfer levers for transferring the batches of biscuits from the separators to positions above the feed pockets and top and bottom plungers for depositing the stacks of biscuits in the feed pockets.

It is sometimes, however, desired to assemble the biscuits or the like in open-topped trays or cartons prior to wrapping, and the present invention provides a modification of the above-mentioned automatic biscuit feed mechanism appropriate for use in the case in which such trays are loaded into the conveyor pockets prior to their arrival into position beneath the magazines.

In the modified feed mechanism according to the invention the bottom plungers are dispensed with and the biscuits are guided into their correct positions in the pockets of the conveyor by a system of guide members. These comprise, beneath the position assumed by each transfer lever when it reaches its discharge position, a pair of spaced fixed guides extending longitudinally of the conveyor, a fixed transverse guide for contacting the rear edges of the biscuits (viewed in the direction of travel of the conveyor) and a movable transverse guide for contacting the front edges of the biscuits. Means, for example operated from the movement which actuates the bottom plungers in the mechanism of U. S. Patent No. 2,683,520, are provided for moving the movable front guides clear of the biscuits prior to commencement of movement of the conveyor and for returning them to operative position during each period of dwell of the conveyor.

Figure 2:
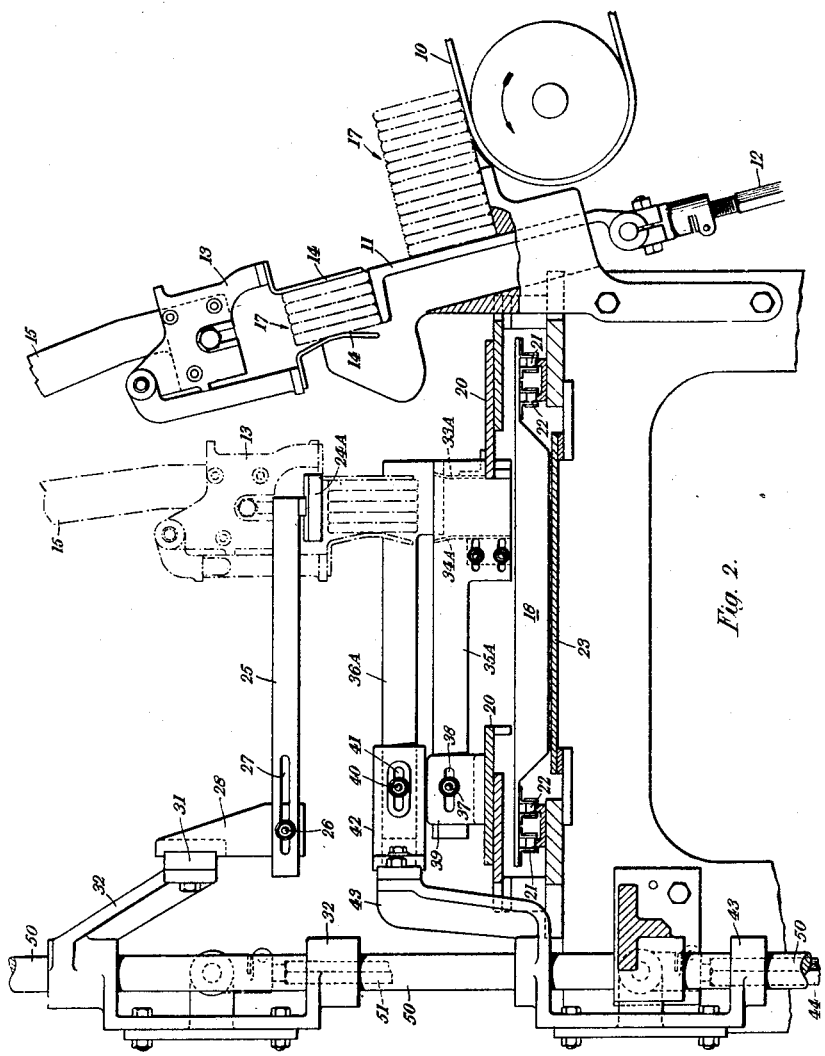

One embodiment of the invention will now be described in detail, by way of example, with reference to the accompanying drawings, in which:

Fig. 1 is a plan view of part of the conveyor,
Fig. 2 is a section on the line II—II in Fig. 1, and
Fig. 3 is a view looking in the direction of the arrow X in Fig. 1.

Like reference characters designate like parts throughout the figures.

Although no trays are shown in the drawings, the apparatus illustrated is appropriate for use in filling the feed pockets of the conveyor with biscuits, whether or not the feed pockets contain trays. It operates on the same principle as that described in U. S. Patent No. 2,683,520 to which reference should be made for a further description of mechanisms not described in detail herein, but it is designed for use with a machine for wrapping larger packages, each containing 23 biscuits. The apparatus accordingly comprises six magazines of the kind described in U. S. Patent No. 2,683,520, and each comprising a belt conveyor 10 for feeding the biscuits 17 to a separator 11. The separator 11 is periodically lifted, as shown in Fig. 2, by a cam operated link 12, to lift biscuits from the head of the procession on the conveyor belt 10 into a transfer lever 13. This has spring jaw 14 for gripping the biscuits and, after it has collected the biscuits from the separator 11, it is moved by a cam operated arm 15, as fully described in U. S. Patent No. 2,683,520, to a discharge position, shown for one of the transfer levers in chain dotted lines in Fig. 2, in which it is positioned over one of the feed pockets of the conveyor.

As the conveyor feed pockets 16 travel intermittently to the positions A—F in Fig. 1, they are gradually filled with biscuits, receiving a batch of five biscuits at the right hand end of the pocket, as seen from the rear of the conveyor, at position A, further batches of five biscuits each at positions B, C and D, a batch of two biscuits at position E and a single biscuit at position F. The transfer levers execute differential movements, as described in U. S. Patent No. 2,683,520, to locate their batches of biscuits correctly in relation to the conveyor, that at position A executing the smallest and that at position F executing the largest movement. The transfer levers 13 at positions A—D carry five biscuits each, the associated separators 11 each lifting five biscuits into the transfer levers at each machine cycle. The transfer lever at position E carries two biscuits only and that at position F carries a single biscuit only, their associated separators extracting respectively two biscuits and one biscuit from their magazines at each machine cycle.

The conveyor feed pockets are defined by pushers 18, front plates 19 and side control plates 20. The pushers 18 are connected at their ends to a pair of outer chains 21 and the front plates 19 are connected at their ends to a pair of inner chains 22. The chains are intermittently driven, as described in U. S. Patent No. 2,683,520, to traverse the biscuits along a feed table 23.

The batches of biscuits are transferred from the transfer levers 13 to the feed pockets 16 by top plungers 24A—24F, one at each of the positions A—F. The top plungers are carried by arms 25, which are adjustable endwise, by pin and slot connections 26, 27, in relation to brackets 28. The brackets 28 are adjustable, longitudinally of the conveyor, by pin and slot connections 29, 30, in relation to a supporting bar 31, mounted on a bracket 32 which can slide on a pair of vertical pillars 50. Up and down movement is imparted to the top plungers by a cam-operated link 51. As the top plungers descend, the batches of biscuits are transferred downwardly from the transfer levers and are guided into their correct positions in the feed pockets of the conveyor by a system of guide members which will now be described.

At each of the positions A—F there are two fixed longitudinal guides 33, 34 for contacting the end biscuits of the batch. As will be seen, each of the guides 34, except the last one 34F, is extended forwardly to form the guide 33 of the next pocket. Thus the guide 34A is extended forwardly to form the guide 33B and so on. As will be seen from Fig. 2, the upper edges of the guides 33, 34 are outwardly flared to give a lead in for the biscuits. At each position A—F is a fixed guide 35, for contacting the rear edges of the biscuits, and a movable guide 36, for contacting the front edges of the biscuits. As will be seen from Fig. 1, the guides 35, 36 decrease progressively in length from position A to position F.

The fixed guides 35 are adjustably mounted, by pin and slot connections 37, 38 (Fig. 2) on brackets 39 on one of the side control plates 20. The movable guides 36 are adjustably mounted, by pin and slot connections 40, 41, on brackets 42 attached to a bracket 43, which is movable up and down on the pillars 50 by means of a cam-operated link 44. After the conveyor has commenced to dwell, the movable guides 36 are moved down to operative position from the position shown in Figs. 2 and 3 by the link 44, slots 45 in the guides 33 permitting of this movement. The top plungers 24 then descend to deliver the batches of biscuits into the conveyor feed pockets. After the top plungers have returned to their top positions and before the conveyor begins to move again, the movable guides 36 are returned to their top positions in which they are clear of the biscuits in the conveyor feed pockets.

What I claim as my invention and desire to secure by Letters Patent is:

1. The combination, with an intermittently moving conveyor having therein a plurality of pockets, of a plurality of magazines for delivering loose biscuits or the like to said conveyor, transfer members operating in timed relationship with said conveyor to transfer batches of biscuits extracted from said magazines to discharge stations situated above successive feed pockets of the conveyor, the total number of biscuits in all of said batches being that required to fill a feed pocket of said conveyor, top plungers for delivering the batches of biscuits from said transfer members to said feed pockets, a system of guide members for guiding the biscuits into their correct positions in the feed pockets, said guide members comprising, beneath each of said discharge stations, a pair of spaced longitudinal fixed guides for contacting the end biscuits of the batch, a fixed transverse guide for contacting the rear edges of the biscuits in the batch and a movable transverse guide for contacting the front edges of the biscuits in the batch, and mechanism for maintaining the movable guides clear of the biscuits during movement of the conveyor and for returning them to operative position during each period of dwell of the conveyor.

2. The combination, with an intermittently moving conveyor having therein a plurality of pockets, of a plurality of magazines for delivering loose biscuits or the like to said conveyor, transfer members operating in timed relationship with said conveyor to transfer batches of biscuits extracted from said magazines to discharge stations situated above successive feed pockets of the conveyor, the total number of biscuits in all of said batches being that required to fill a feed pocket of said conveyor, top plungers for delivering the batches of biscuits from said transfer members to said feed pockets, a system of guide members for guiding the biscuits into their correct positions in the feed pockets, said guide members comprising, beneath each of said discharge stations, a pair of spaced longitudinal fixed guides for contacting the end biscuits of the batch, said longitudinal guides having outwardly flared upper ends to provide a lead in for the biscuits, a fixed transverse guide for contacting the rear edges of the biscuits in the batch and a movable transverse guide for contacting the front edges of the biscuits in the batch, and mechanism for maintaining the movable guides clear of the biscuits during movement of the conveyor and for returning them to operative position during each period of dwell of the conveyor.

3. A combination as claimed in claim 1, wherein one of the longitudinal guides associated with each discharge station except the last is extended forwardly to constitute the longitudinal guide for contacting the opposite end of the batch of biscuits delivered to the conveyor at the next discharge station.

4. The combination, with an intermittently moving conveyor having therein a plurality of pockets, of a plurality of magazines for delivering loose biscuits or the like to said conveyor, transfer members operating in timed relationship with said conveyor to transfer batches of biscuits extracted from said magazines to discharge stations situated above successive feed pockets of the conveyor, the total number of biscuits in all of said batches being that required to fill a feed pocket of said conveyor, top plungers for delivering the batches of biscuits from said transfer members to said feed pockets, a system of guide members for guiding the biscuits into their correct positions in the feed pockets, said guide members comprising, beneath each of said discharge stations, a pair of spaced longitudinal fixed guides for contacting the end biscuits of the batch, a fixed transverse guide for contacting the rear edges of the biscuits in the batch and a movable transverse guide for contacting the front edges of the biscuits in the batch, a vertically reciprocable member carrying said top plungers, a second vertically reciprocable member carrying said movable guides and separate cams for imparting reciprocation to said reciprocable members to impart downward delivery strokes followed by upward return strokes to said top plungers and to move said movable guides clear of the biscuits during movement of the conveyor and to return them to operative position during periods of dwell of the conveyor.

5. The combination, with an intermittently moving conveyor having therein a plurality of pockets, of a plurality of magazines for delivering loose biscuits or the like to said conveyor, transfer members operating in timed relationship with said conveyor to transfer batches of biscuits extracted from said magazines to discharge stations situated above successive feed pockets of the conveyor, each of said transfer members having a pair of downwardly depending spring jaws for gripping the associated batch of biscuits and the total number of biscuits in all of said batches being that required to fill a feed pocket of said conveyor, top plungers for delivering the batches of biscuits from said transfer members to said feed pockets, a system of guide members for guiding the biscuits into their correct positions in the feed pockets, said guide members comprising, beneath each of said discharge stations, a pair of spaced longitudinal fixed guides for contacting the end biscuits of the batch, a fixed transverse guide for contacting the rear edges of the biscuits in the batch and a movable transverse guide for contacting the front edges of the biscuits in the batch, and mechanism for maintaining the movable guides clear of the biscuits during movement of the conveyor and for returning them to operative position during each period of dwell of the conveyor.

References Cited in the file of this patent
UNITED STATES PATENTS

| 2,092,916 | Hildebrand | Sept. 14, 1937 |
| 2,614,679 | Sandberg | Oct. 21, 1952 |
| 2,683,520 | Hopton | July 13, 1954 |